R. SYMMONDS, Jr.
ADJUSTABLE STEERING POST FOR AUTOMOBILES.
APPLICATION FILED JULY 22, 1909.

1,020,376.

Patented Mar. 12, 1912.

Witnesses:
Harry S. Gaither
Frank Chamberlin

Inventor:
Robert Symmonds Jr
by Chamberlin & Freudenreich
attys

UNITED STATES PATENT OFFICE.

ROBERT SYMMONDS, JR., OF KENOSHA, WISCONSIN, ASSIGNOR TO THOMAS B. JEFFERY, OF KENOSHA, WISCONSIN; KATE E. JEFFERY, CHARLES T. JEFFERY, AND HAROLD W. JEFFERY EXECUTORS OF SAID THOMAS B. JEFFERY, DECEASED.

ADJUSTABLE STEERING-POST FOR AUTOMOBILES.

1,020,376.   Specification of Letters Patent.   Patented Mar. 12, 1912.

Application filed July 22, 1909. Serial No. 508,937.

*To all whom it may concern:*

Be it known that I, ROBERT SYMMONDS, Jr., a citizen of the United States, residing at Kenosha, county of Kenosha, State of Wisconsin, have invented a certain new and useful Improvement in Adjustable Steering-Posts for Automobiles, and declare the following to be a full, clear, and exact description of the same, such as will enable others skilled in the art to which it pertains to make and use the same, reference being had to the accompanying drawings, which form a part of this specification.

My invention relates to automobiles and has for its object to provide a steering post which may be adjusted so as to place it in the position most convenient to any operator.

My invention has for a further object to provide a simple and effective construction and arrangement of parts whereby an automobile steering post will be securely held in any position to which it may be adjusted.

Figure 1:
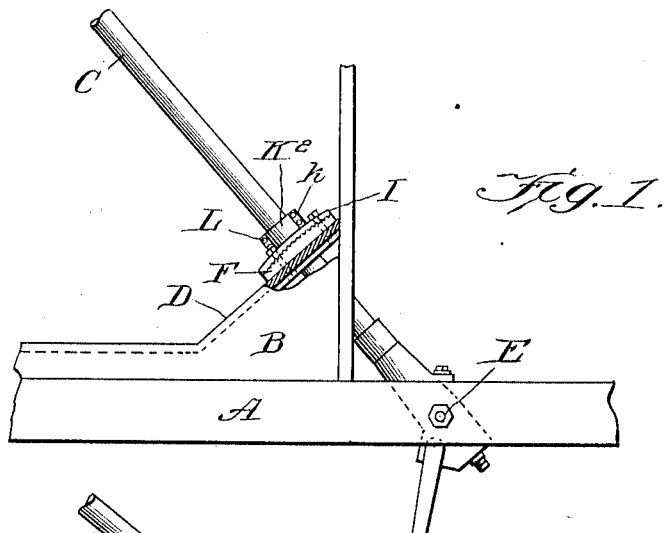
Figure 2:
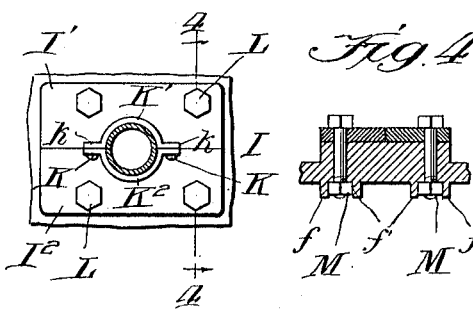
Figure 4:
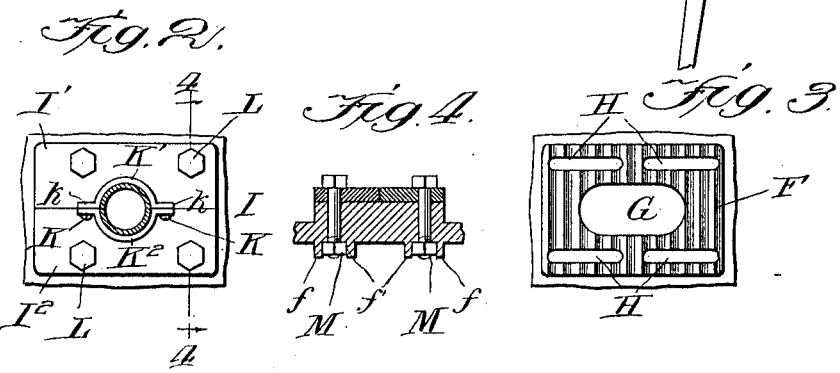
Figure 3:
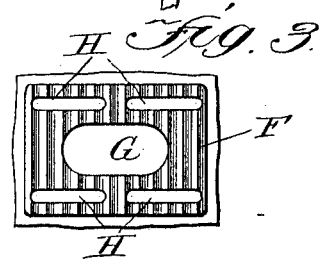

The various features of novelty whereby my invention is characterized will hereinafter be pointed out with particularity in the claims; but, for a full understanding of my invention and of its various objects and advantages, reference may be had to the following detailed description taken in connection with the accompanying drawing, wherein:

Figure 1 is a view of a fragment of an automobile and the steering post, illustrating a preferred adjustable mounting for the post; Fig. 2 is a section taken through the steering post directly above the segment member carried thereby and showing this segment member in plan; Fig. 3 is a top view of the stationary segment which coöperates with the segment member on the post; Fig. 4 is a section taken on line 4—4 of Fig. 2, and illustrates the fastening means between the two segment members; and Fig. 5 is a view similar to Fig. 1, showing an arrangement wherein the post occupies a different position, with respect to the body, than in Fig. 1.

Referring to Figs. 1 to 4, A and B represent respectively, the frame and the body of an automobile structure, these being of any usual or preferred type and being permanently united or independent of each other as may be desired, the present invention being confined to no particular automobile structure. C is a steering post of any usual or preferred form, this post being illustrated as passing through the floor or footboard D and extending at its lower end adjacent to the frame A. The lower end of the post is pivotally connected to the frame by means of a bolt or shaft E, thereby permitting the post to be oscillated so as to bring the steering wheel into any desired relation, within limits, with respect to the driver's seat. On the footboard is a toothed segment F arranged concentrically with the bolt or shaft E. This segment is provided with an elongated opening G through which the post extends and with a series of elongated parallel slots H. Upon the steering post is detachably mounted a second toothed segment I adapted to coöperate with the segment F. The segment on the post is so arranged that it may be removed, or at least adjusted axially of the post so as to disengage it from the coöperating segment, it being evident that when the two segments are locked together they serve to hold the post firmly in one position. To this end the segment I is preferably made in two halves $I^1$ and $I^2$, each having a semi-cylindrical sleeve portion as indicated at $K^1$ and $K^2$. The sleeve portions are provided with flanges $k$ which are adapted to be fastened together by means of screws or bolts K, thereby clamping the segment upon the post. In order to assist the bolts K in holding the movable segment in engagement with the stationary segment, there may be employed a second set of bolts L which pass through the segment I and through the elongated slots H in the segment F. If desired, the sleeve members $K^1$ and $K^2$ may be so proportioned that when the flanges are bolted together the sleeve is simply a loose fit upon the post, making it unnecessary to loosen the screws or bolts K when it is desired to adjust the post. For convenience, the underside of the stationary segment may be provided with ribs $f$ and $f^1$ extending along and parallel with the slots H, the ribs of each set being far enough apart to receive between them a nut such as M. The ribs prevent the nuts from turning so that the locking of the post may be accomplished from above by simply turning the bolts. It will be seen that when the two segments are bolted together, the post is firmly locked in position, being prevented from turning about the pivotal connection at its lower end by means of the interlocking teeth on the segment. It is, of course, not absolutely necessary to make the segments toothed, since the two segments might be held together frictionally by means of the bolts; but it is preferable to provide teeth on the segments in order to prevent any possibility of slipping on the part of the post. When it is desired to change the adjustment of the post, the bolts L are loosened sufficiently to permit the movable segment to be lifted out of engagement with the coöperating segment and the post is then rotated into the desired position and the bolts again tightened, locking the post securely in its new position.

Figure 5:
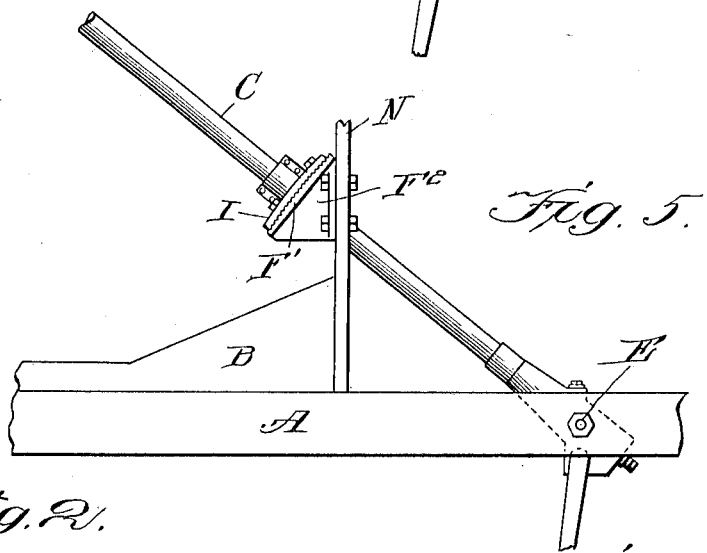

The arrangement shown in Fig. 5 is just the same as that in Fig. 4, except that the steering post passes through the dash-board N instead of through the foot-board. In this instance the segment $F^1$ is carried by a bracket $F^2$ which may be bolted or otherwise secured at the proper point upon the dash.

While I have described with particularity a preferred form of my invention, I do not desire to be limited to the particular structural details disclosed, but intend to cover all forms and arrangements falling within the terms employed in the definitions of my invention constituting the appended claims.

What I claim is:

1. In an automobile, a steering post pivotally connected at its lower end to a part of the automobile structure, a toothed segment having an elongated slot through which the post passes, a coöperating toothed segment carried by the post, one of said segments having elongated bolt-receiving slots arranged parallel with the aforesaid slot, and bolts passing through said bolt-receiving slots and through the other segment.

2. In an automobile, a steering post pivotally connected at its lower end to a part of the automobile structure, a segment having an elongated slot through which the post passes, a coöperating segment carried by the post, one of said segments having elongated bolt-receiving slots arranged parallel with the aforesaid slot, and bolts passing through said bolt-receiving slots and through the other segment.

3. In an automobile, a steering post pivotally connected at its lower end to a part of the automobile structure, a segment having an elongated slot through which the post passes, a coöperating segment carried by the post, the latter segment being made in halves clamped about the post, one of said segments having elongated bolt-receiving slots arranged parallel with the aforesaid slot, and bolts passing through said bolt-receiving slots and into the other segment.

In testimony whereof, I sign this specification in the presence of two witnesses.

ROBERT SYMMONDS, Jr.

Witnesses:
 Ed. Dixon,
 Frederick Purdy.

Copies of this patent may be obtained for five cents each, by addressing the "Commissioner of Patents, Washington, D. C."